United States Patent
Himmer et al.

(10) Patent No.: US 12,017,548 B2
(45) Date of Patent: Jun. 25, 2024

(54) METHOD AND ARRANGEMENT FOR MOUNTING AN ELECTROMAGNETIC CHARGING DEVICE ON A SUBSTRATE

(71) Applicant: MAHLE International GmbH, Stuttgart (DE)

(72) Inventors: Thomas Himmer, Reichenbach (DE); Christopher Laemmle, Stuttgart (DE); Holger Schroth, Maulbronn (DE)

(73) Assignee: Mahle International GmbH, Stuttgart (DE)

( * ) Notice: Subject to any disclaimer, the term of this patent is extended or adjusted under 35 U.S.C. 154(b) by 130 days.

(21) Appl. No.: 17/492,606

(22) Filed: Oct. 2, 2021

(65) Prior Publication Data

US 2022/0105816 A1    Apr. 7, 2022

(30) Foreign Application Priority Data

Oct. 2, 2020 (DE) ..................... 10 2020 212 488.4

(51) Int. Cl.
*H02J 7/00* (2006.01)
*B60L 53/12* (2019.01)
*H02J 7/02* (2016.01)

(52) U.S. Cl.
CPC ............ *B60L 53/12* (2019.02); *H02J 7/0042* (2013.01); *H02J 7/02* (2013.01)

(58) Field of Classification Search
CPC .............................. B60L 53/12; H02J 7/0042
USPC ........................................................ 320/108
See application file for complete search history.

(56) References Cited

U.S. PATENT DOCUMENTS

| | | | | |
|---|---|---|---|---|
| 2013/0300202 | A1* | 11/2013 | Keeling | H01F 38/14 307/104 |
| 2019/0242658 | A1 | 8/2019 | Schiehlen | |
| 2021/0081624 | A1* | 3/2021 | Kovarik | E01F 9/578 |
| 2021/0402882 | A1* | 12/2021 | Dames | B60M 7/003 |
| 2022/0105816 | A1* | 4/2022 | Himmer | H02J 7/02 |
| 2023/0111330 | A1* | 4/2023 | Boettigheimer | H02J 50/10 320/109 |

FOREIGN PATENT DOCUMENTS

| | | |
|---|---|---|
| DE | 7037837 U | 1/1971 |
| DE | 102017117623 A1 | 2/2019 |
| DE | 102018111242 A1 | 11/2019 |
| EP | 2620960 A1 | 7/2013 |
| EP | 3332206 B1 | 4/2019 |

OTHER PUBLICATIONS

Estrich. In: Wikipedia, Die freie Enzyklopaedie. Bearbeitungsstand: Jul. 27, 2020. URL: https://de.wikipedia.org/w/index.php?title=Estrich&oldid=202249380 [abgerufen am Sep. 15, 2021] and English Machine Translation.

* cited by examiner

Primary Examiner — Brian Ngo
(74) Attorney, Agent, or Firm — Ewers IP Law PLLC; Falk Ewers

(57) ABSTRACT

A method for mounting an electromagnetic charging device on a substrate which can be driven on by an at least partially electric motor vehicle includes (a) laying a separating film on the substrate, (b) applying a flowable and hardenable casting material on the separating film, (c) arranging the electromagnetic charging device on the still flowable casting material, (d) aligning the charging device, and (e) (pre-)fixing the charging device with hardening of the casting material.

17 Claims, 2 Drawing Sheets

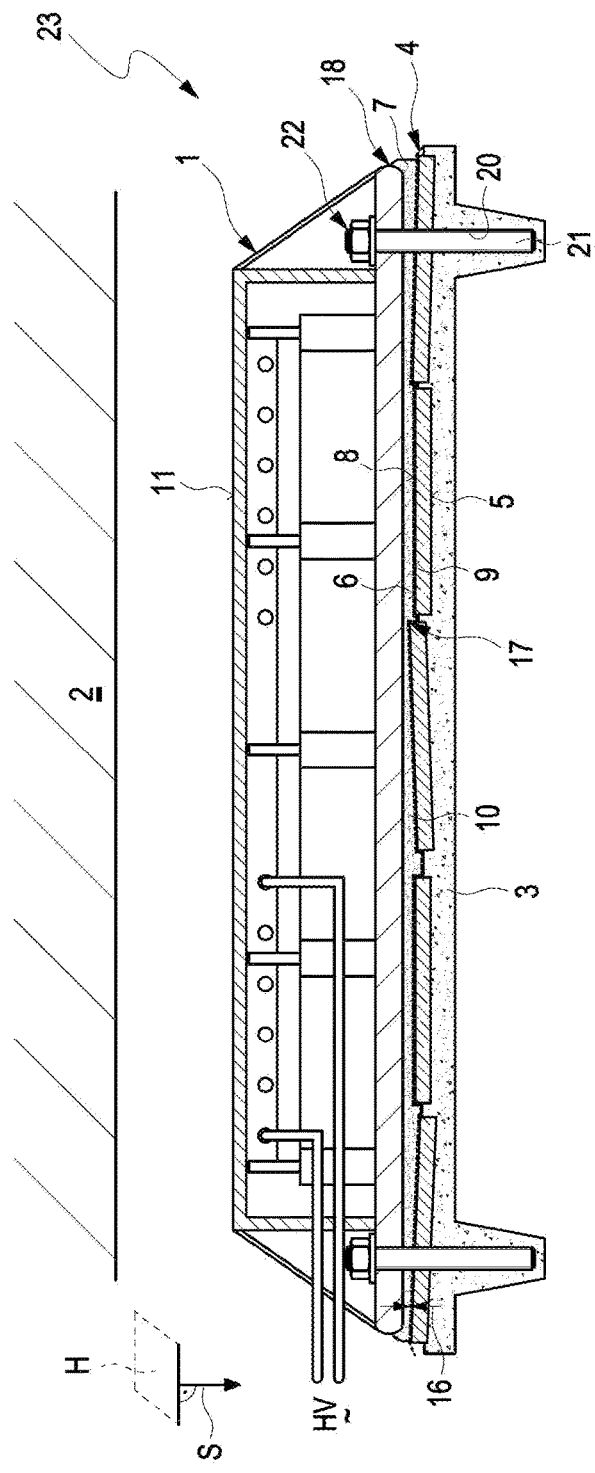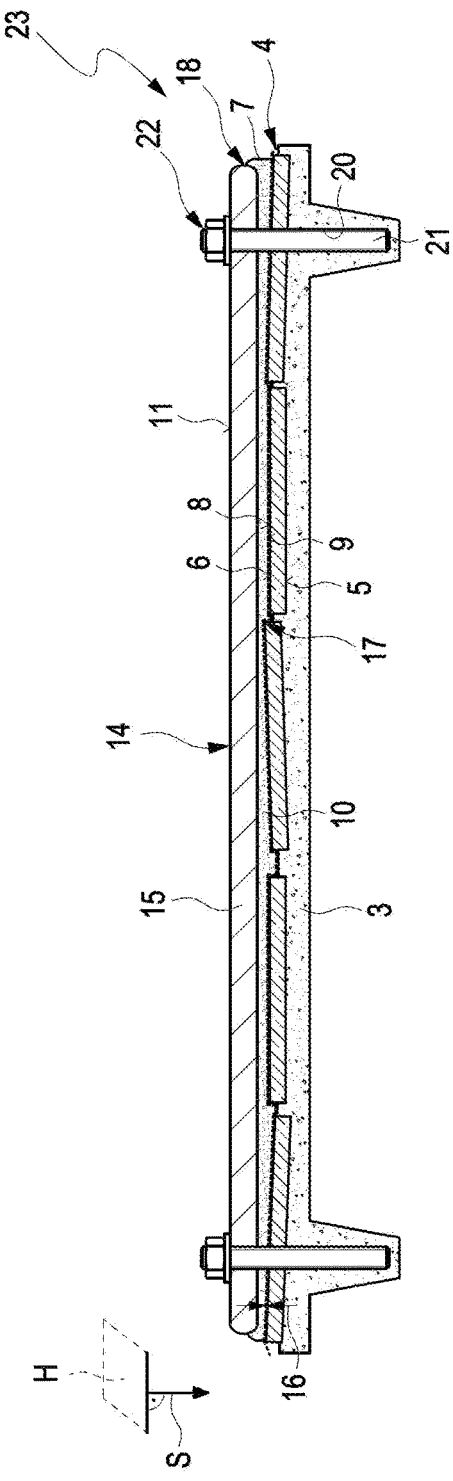

METHOD AND ARRANGEMENT FOR MOUNTING AN ELECTROMAGNETIC CHARGING DEVICE ON A SUBSTRATE

CROSS REFERENCE TO RELATED APPLICATIONS

This application claims priority to German patent application DE 10 2020 212 488.4, filed Oct. 2, 2020, the entire content of which is incorporated herein by reference.

TECHNICAL FIELD

In a first aspect, the disclosure relates to a method for mounting an electromagnetic charging device on a substrate which can be driven on by an at least partially electrified motor vehicle. The disclosure relates in addition, in a second aspect and in a third aspect respectively to a method for producing a universal mounting interface for a mounting of an electromagnetic charging device on a substrate which can be driven on by an at least partially electrified motor vehicle. Furthermore, the disclosure relates to an arrangement for the wireless charging of an at least partially electrified motor vehicle with electrical energy.

BACKGROUND

Usually, the principle of electromagnetic induction is used for the wireless and contactless charging of at least partially electrified motor vehicles which usually comprise an electrical energy storage device for storing electrical energy which is fed to the motor vehicle during charging. Here, for the wireless charging of such motor vehicles, electromagnetic charging devices with at least one electromagnetic transmitter coil are used, with which an electric current can be induced in at least one electromagnetic receiver coil which is present in the motor vehicle and is electrically connected with the electrical energy storage device.

In a typical arrangement for the wireless charging of at least partially electrified motor vehicles, the electromagnetic charging device is mounted on a substrate, so that the motor vehicle, which is to be inductively charged, can travel, with its underbody on which the electromagnetic receiver coil is present, over the electromagnetic charging device. Such electromagnetic charging devices, as they are arranged on the substrate, are also designated as "ground assemblies". A possibility, which is often also described by the attribute "above-the-ground", for realizing such a ground assembly makes provision that the electromagnetic charging device is laid above onto the substrate and, if applicable, is fastened there.

Here, in conventional above-the-ground solutions, the substrate on which the electromagnetic charging device is fastened, lying flat, must fulfil high requirements with regard to its evenness; this is because any unevenness's of the substrate prevent the flat contact of the charging device with the substrate. On the one hand, an air gap thus occurs between the charging device and the substrate, which air gap has a thermally insulating effect and which thereby makes difficult a removal of the lost heat occurring in operation in the electromagnetic charging device. On the other hand, the unevennesses lead to a locally intensively increased mechanical load of the charging device, in particular when the motor vehicle which is to be electrically charged travels over the charging device in order to take up its charging position.

SUMMARY

It is therefore an object of the present disclosure—in particular in order to address the problem indicated above—, to indicate new ways for methods for the mounting of an electromagnetic charging device on a substrate which can be driven on, and for methods for the production of a universal mounting interface, with which an electromagnetic charging device can be mounted on a substrate which can be driven on, and for arrangements with such an electromagnetic charging device or respectively mounting interface.

This problem is solved by a method for mounting an electromagnetic charging device an arrangement for the wireless, in particular contactless, charging of an at least partially electrified motor vehicle with electrical energy, as described herein.

Accordingly, a basic idea of all aspects of the disclosure for the compensating of any unevennesses of the substrate between an electromagnetic charging device or respectively an adapter, on which such an electromagnetic charging device can be mounted, and the substrate, is to provide an initially flowable casting material, which is only hardened after arranging of the charging device or respectively the adapter on the casting material; or respectively to arrange such an adapter directly on an initially flowable substrate material, which is only hardened after the arranging of the adapter on the substrate material with the formation of the solid substrate.

Advantageously, any unevennesses of the substrate can thus be compensated effectively or respectively can be prevented from the outset, which reduces the mechanical load of the charging device or respectively of the adapter and improves the thermal coupling between charging device or respectively adapters and substrate.

In a first aspect, the disclosure relates to a method for mounting an electromagnetic charging device, with which an at least partially electrified motor vehicle can be charged inductively with electrical energy wirelessly, in particular in a contactless manner, on a substrate which can be driven on by the motor vehicle. The method comprises the following provisions a) to d). According to a first provision a), a laying of a separating film on the substrate takes place, so that an underside of the separating film touches an upper side of the substrate. Before the laying of the separating film, the upper side of the substrate can be cleaned. In addition, the substrate can be surveyed for unevennesses. In a second provision b), a flowable and hardenable casting material is applied onto an upper side of the separating film lying opposite the underside of the separating film. A quantity of casting material can be coordinated here to the unevennessses of the substrate. A third provision c) provides for the electromagnetic charging device to be arranged on the still flowable casting material, so that between an underside of the charging device and the upper side of the separating film a joint is produced, which is filled with the casting material. In a fourth provision d), the charging device, arranged according to provision e), is (pre-)fixed with hardening of the casting material. Advantageously, with the casting material, the desirable compensation of any unevennesses of the substrate can thus be realized in a technically particularly simple manner. In addition, in an advantageous manner the separating film provides for a dismantling of the charging device from the substrate to be able to be carried out without casting material remaining on the substrate or the substrate being able to be damaged on removing of the casting material.

Expediently, on the underside of the charging device at least one form-fit element with an undercut can be present.

This form-fit element can be enclosed by the still flowable casting material in provision b). This permits a particularly reliable connection of the charging device with the casting material. The underside of the charging device can, however, also be configured to be free of a form-fit element or respectively free of an undercut.

In addition, with a second aspect, the disclosure relates to a method for producing a mounting interface for a mounting of an electromagnetic charging device, with which an at least partially electrified motor vehicle can be charged inductively with electrical energy, wirelessly, in particular in a contactless manner, on a substrate which can be driven on by the motor vehicle. The method of the second aspect of the disclosure comprises four provisions a) to d). According to a first provision a), a laying of a separating film on the substrate takes place, so that an underside of the separating film touches an upper side of the substrate. Before the laying of the separating film the upper side of the substrate can be cleaned. The substrate can be surveyed for unevennesses. In a second provision b), a flowable and hardenable casting material is applied onto an upper side of the separating film lying opposite the underside of the separating film. A quantity of casting material which is used can be coordinated with the unevennesses of the substrate. According to a third provision c), an arranging of an adapter for mounting the charging device on the still flowable casting material takes place, so that a joint, filled with the casting material, is produced between an underside of the adapter and the upper side of the separating film. According to a fourth provision d), a (pre-)fixing of the adapter, arranged according to provision c) takes place with hardening of the casting material with the production of the mounting interface. Advantageously, with the casting material, the desirable compensation of any unevennesses of the substrate can thus be realized in a technically particularly simple manner. With the adapter, the charging device can be arranged exchangeably on the substrate, guaranteeing position accuracy. In addition, the separating film makes provision, in an advantageous manner, that a dismantling of the adapter for the substrate can be carried out without casting material remaining on the substrate or the substrate being able to be damaged on removing of the casting material.

In an advantageous further development of the method according to one of the first two aspects of the disclosure, the separating film comprises a plastic or consists of a plastic. The separating film has here a thickness of less than 250 µm. Typically, the separating film has a thickness of less than 100 µm. Particularly typically, the separating film has a thickness of less than 50 µm. The thickness of the film can be established by the smallest distance between the upper side and the underside of the separating film. Such a separating film nestles particularly well against any unevennesses of the substrate, so that a uniform mechanical abutment of the separating film on the substrate can be achieved.

In a further advantageous further development of the method according to one of the first two aspects of the disclosure, the separating film comprises a metal, in particular aluminium, or consists of such a metal. The metal separating film has here a thickness of less than 50 µm. Typically, the metal separating film has a thickness of less than 20 µm. Particularly typically the metal separating film has a thickness of less than 10 µm. Such a metal separating film enables a particularly good heat removal of the waste heat occurring in operation of the electromagnetic charging device into the substrate.

In a further development of the method according to one of the first two aspects of the disclosure, the separating film is formed in an embossed or folded manner. Here, a perpendicular extent of the embossing or folding of the separating film before the applying of the casting material in provision b) is greater than a perpendicularly measured maximum unevenness of the upper side of the substrate. Advantageously, the separating film can thus contribute, through deformation of its folding or respectively embossing, to the compensation of the unevennesses of the upper side of the substrate, so that particularly great unevennesses can also be compensated.

In an advantageous further development of the method according to the first or the second aspect of the disclosure, the method comprises an additional provision c1). According to this provision c1), a production of a predetermined breaking point takes place, which after hardening of the casting material in provision d) runs along an edge of the charging device or respectively of the adapter surrounding the underside of the charging device or respectively of the adapter, wherein the predetermined breaking point is typically produced chronologically before the carrying out of provision d). With this predetermined breaking point, any protrusions of casting material (if hardened) can be removed particularly easily by breaking off. It shall be understood that protruding casting material can also be wiped off before hardening or can be removed with a spatula or trowel.

In a further typical further development of the method according to one of the first two aspects of the disclosure, the method comprises an additional provision d1). According to this provision d1), a removing of the protrusion of separating film and casting material, situated outside the joint, takes place. Thereby, a clean and attractive appearance of the electromagnetic charging device after its mounting or respectively of the mounting interface after its production can be achieved in a particularly simple manner.

In a further development of the method according to the first or the second aspect of the disclosure, the separating film, on laying in provision a) corresponds to a flat blank which projects on all sides by at least 20 cm over the underside of the charging device or respectively of the adapter. Thereby, it can be advantageously ensured that casting material, which as a result of the arranging of the electromagnetic charging device or respectively of the adapter exits from the joint, is kept away from the substrate.

In addition, in a third aspect of the disclosure, the disclosure relates to a method for producing a mounting interface for a mounting of an electromagnetic charging device, with which an at least partially electrified motor vehicle can be charged inductively with electrical energy in a wireless, in particular contactless manner, on or in a substrate which can be driven on by the motor vehicle. The method according to the third aspect of the disclosure comprises four provisions a) to d). In a first provision a) of the method, a casting of a flowable and hardenable substrate material takes place which, after its hardening, forms the substrate. In a second provision b) of the method, an adapter for the mounting of the charging device is arranged directly on the still flowable substrate material, so that an underside of the adapter is wetted with the still flowable substrate material. The adapter can be formed in a trough-shaped or plate-shaped manner. A third provision c) provides for the adapter, arranged according to provision b), to be (pre-)fixed to the substrate with hardening of the substrate material, so that the mounting interface is formed. Thus, a production of the mounting interface can be advantageously achieved in a technically particularly simple manner.

According to a further development of the method according to one of the three aspects of the disclosure, the charging device or respectively the adapter is aligned, typically horizontally, chronologically before the (pre-)fixing. Such an alignment enables a particularly precise positioning of a motor vehicle which is to be charged relative to the charging device or respectively of the charging device at the mounting interface.

In an advantageous further development of the method according to the second or the third aspect of the disclosure, at least one form-fit element with an undercut is present on the underside of the adapter. This form-fit element is enclosed by the still flowable casting material/substrate material. This permits a particularly good mechanical connection of the adapter to the casting material or respectively to the substrate material.

In a further development of the method according to one of the three aspects of the disclosure, the casting material or respectively the substrate material comprises floating screed, in particular calcium sulphate floating screed, or/and synthetic resin or/and rubber mortar. This means that the casting material can be any desired mixture of the components listed above, wherein individual ones of the components can be dispensed with. Alternatively or additionally, the casting material or respectively the substrate material is filled, in particular with elastic fibres. Such a casting material or respectively such a substrate material advantageously proves to be mechanically particularly resilient and impact resistant.

According to a further advantageous further development of the method according to the first, second or third aspect of the disclosure, the casting material or respectively the substrate material has, after hardening, a thermal conductivity of at least 1.5 W/(m*K). After hardening, the casting material or respectively the substrate material typically has a thermal conductivity of at least 2.0 W/(m*K). This enables a particularly good removal of the lost heat occurring in operation of the electromagnetic charging device into the substrate.

In a further development of the method according to one of the three aspects of the disclosure, typically chronologically before the arranging of the charging device or respectively of the adapter, most typically before the laying of the separating film, at least one hole, in particular a blind hole, is produced in the substrate and an anchoring bolt is fastened in the hole. Here, the aligning of the charging device or respectively of the adapter is carried out by handtight tightening of a screw connection produced with the anchoring bolt and acting on the charging device or respectively on the adapter. Chronologically after the hardening of the casting material or respectively of the substrate material, the screw connection is retightened for the (final) fixing of the charging device or respectively of the adapter, in particular with a tightening torque of a maximum of 10 Nm. The charging device or respectively the adapter can thus be fastened in a particularly simple, effective and, at the same time, reliable manner. In addition, the screw connection prevents a lateral slipping of the charging device or respectively of the adapter before hardening of the casting material or respectively of the substrate material.

The disclosure relates, furthermore, to an arrangement for the wireless, in particular contactless, charging of an at least partially electrified motor vehicle with electrical energy. The arrangement comprises a substrate, able to be driven on by the motor vehicle, which typically forms a parking space. Furthermore, the arrangement has an electromagnetic charging device, with which the motor vehicle can be charged inductively with electrical energy. Alternatively, the arrangement comprises a universal mounting interface on which such an electromagnetic charging device can be mounted or is mounted. Here, the charging device is mounted on the substrate with a method according to the first aspect of the disclosure or respectively the mounting interface is produced with a method according to the second or the third aspect of the disclosure. Therefore, the advantages of the method which are indicated above according to the three aspects of the disclosure also apply to the arrangement according to the disclosure.

Further important features and advantages of the disclosure will emerge from the drawings and from the associated figure description with the aid of the drawings.

It shall be understood that the features mentioned above and to be explained further below are able to be used not only in the respectively indicated combination, but also in other combinations or in isolation, without departing from the scope of the present disclosure.

Exemplary embodiments of the disclosure are illustrated in the drawings and are explained more closely in the following description, wherein the same reference numbers refer to identical or similar or functionally identical components.

BRIEF DESCRIPTION OF THE DRAWINGS

The disclosure will now be described with reference to the drawings wherein:

FIG. 1 shows in section along a gravity direction, an exemplary embodiment of an electromagnetic charging device, mounted with a method according to a first aspect of the disclosure, FIG. 2 shows in section along the gravity direction, an exemplary embodiment of a mounting interface produced with a method according to a second aspect of the disclosure.

DESCRIPTION OF EXEMPLARY EMBODIMENTS

Figure 3:
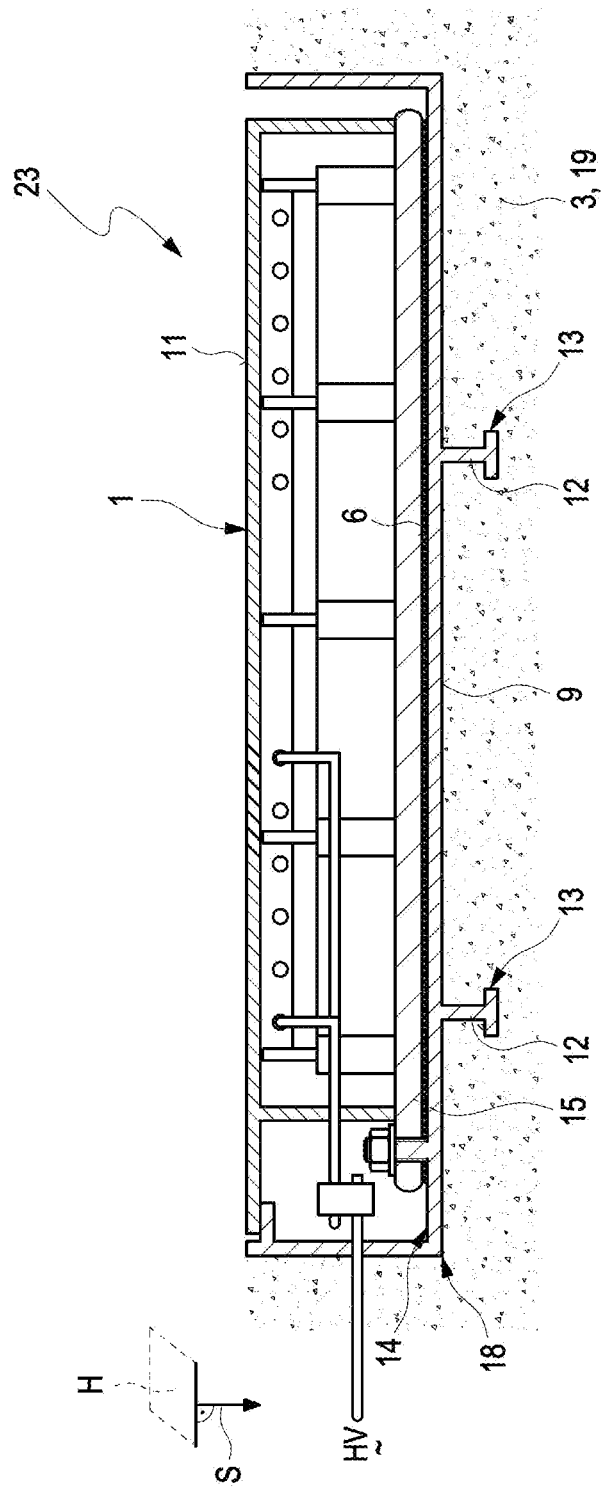
FIG. 3 shows in section along the gravity direction, an exemplary embodiment of a mounting interface produced with a method according to a third aspect of the disclosure.

In FIG. 1 in a section along a gravity direction S, an electromagnetic charging device 1 is shown by way of example, which is mounted with a method according to a first aspect of the disclosure. The method serves for the mounting of such an electromagnetic charging device 1 on a substrate 3 which is able be driven on by an at least partially electrified motor vehicle 2. With the charging device 1, such an at least partially electrified motor vehicle 2 can be inductively charged with electrical energy wirelessly, in the shown example in a contactless manner. For this, the motor vehicle 2 can comprise an electrical energy storage device, in which the electrical energy can be stored after or respectively during the inductive charging. This energy storage device can be, for example, a traction battery for supplying an electric drive of the motor vehicle 2.

The method according to the first aspect of the disclosure comprises four provisions a) to d). According to a first provision a), a separating film 4 is laid on the substrate 3, so that an underside 5 of the separating film 4 touches an upper side 6 of the substrate 3. In a second provision b), a flowable and hardenable casting material 7 is applied onto an upper side 8 of the separating film 4 lying opposite the underside 5 of the separating film 4. A third provision c) of the method makes provision that the electromagnetic charging device 1 is arranged on the still flowable casting material 7—therefore before the casting material 7 has been hardened. Here, the charging device 1 is arranged according to provision c) in such a way that between an underside 9 of the charging device 1 and the upper side 8 of the separating film 4 a joint 10, filled with the casting material 7, is produced. Subsequently, the charging device 1 is aligned for example. For example, an upper side 11 of the charging device 1 lying opposite the underside 9 of the charging device 1 is aligned in a horizontal manner. In the exemplary embodiment which is shown, the upper side 11 of the charging device 1 is brought to coincide with a horizontal plane E, the normal vector of which runs in gravity direction S, for the horizontal aligning of the charging device 1 in provision b). The method comprises in addition a fourth provision d), in which the charging device 1, arranged according to provision c), is (pre-)fixed in its alignment with hardening of the casting material 7.

In FIG. 2 in a section along the gravity direction, an exemplary embodiment is shown of a mounting interface 14, which is produced with a method according to a second aspect of the disclosure. The method serves for the producing of the mounting interface 14, shown by way of example in FIG. 2, on a substrate 3 which can be driven on by an at least partially electrified motor vehicle 2—not shown in FIG. 2. The mounting interface 14 again is arranged for a mounting of an electromagnetic charging device 1—not illustrated in FIG. 2—on the substrate 3. With such an electromagnetic charging device 1, the at least partially electrified motor vehicle 2 can be charged inductively with electrical energy wirelessly, for example in a contactless manner. With regard to the method according to the second aspect of the disclosure, the motor vehicle 2 can correspond to the motor vehicle 2 described above and illustrated roughly schematically in FIG. 1.

The method according to the second aspect of the disclosure comprises four provisions a) to d). According to a first provision a), a separating film 4 is laid on the substrate 3 in such a way that an underside 5 of the separating film 4 touches an upper side 6 of the substrate 3. In a second provision b), a flowable and hardenable casting material 7 is applied onto an upper side 8 of the separating film 4 lying opposite the underside 5 of the separating film 4. A third provision c) of the method according to the second aspect of the disclosure makes provision that an adapter 15, which is set up for the mounting of the charging device 1, is arranged on the still flowable casting material 7—therefore before the casting material 7 has been hardened. Here, the adapter 15 is arranged on the still flowable casting material 7 in such a way that between an underside 9 of the adapter 15 and the upper side 8 of the separating film 4 a joint 10 is produced, which is filled with the casting material 7. Subsequently, for example an aligning of the adapter 15 takes place. Here for example an upper side 10 of the adapter 15, lying opposite the underside 9, is aligned in a horizontal manner, therefore is brought to coincided with the horizontal plane H. The method comprises in addition a fourth provision d), according to which the adapter 15, arranged in provision c), is (pre-)fixed in its alignment with hardening of the casting material 7 with the production of the mounting interface 14.

Both in the method according to the first aspect of the disclosure, and also in the method according to the second aspect of the disclosure, the separating film 4 comprises for example a plastic or consists of such. This plastic separating film 4 has, for example, a thickness 16 of less than 250 μm. In a typical variant, the separating film 4 has a thickness 16 of less than 100 μm. In a particularly typical variant, the separating film 4 has a thickness 16 of less than 25 μm.

Alternatively, the separating film 4 comprises for example a metal, such as aluminium, or consists of such. The metal separating film 4 has for example a thickness 16 of less than 50 μm. In a typical variant, the metal separating film 4 has a thickness 16 of less than 20 μm. In a particularly typical variant, the metal separating film 4 has a thickness 16 of less than 10 μm. The separating film 4—of no matter which material—is, for example embossed or folded. The separating film 4 can have a trapezial fold, such as is already known from EP 3 332 206 B1 for a different application. A perpendicular extent of the embossing or fold of the separating film 4, therefore measured along the gravity direction, before the casting material 7 is applied in provision b), is greater than a maximum unevenness 17 of the upper side 6 of the substrate 3 measured parallel thereto. On aligning of the charging device 1 or respectively of the adapter 15, unevennesses present on the upper side 6 of the substrate 3 can be compensated by deformation of the embossing or respectively of the fold of the separating film 4.

In the method according to the first aspect of the disclosure and in the method according to the second aspect of the disclosure for example in an additional provision c1) a predetermined breaking point is produced. This predetermined breaking point is produced for example chronologically before the carrying out of provision d), therefore before the hardening of the casting material 7. After the hardening of the casting material 7 in provision d), the predetermined breaking point runs along an edge 18 of the charging device 1 or respectively of the adapter 15, which surrounds the underside of the charging device 1 or respectively of the adapter 15. The method of the first and of the second aspect of the disclosure comprises for example furthermore an additional provision d1), according to which the protrusion of separating film 4 and casting material 7 situated outside the joint 10 is removed. Before such a removing of the protrusion of separating film 4, therefore in any case on laying in provision a), the separating film 4 corresponds to a flat blank which projects over the underside 9 of the charging device 1 or respectively of the adapter 15 on each side for example by at least 20 cm. The separating film 4 can therefore have a distinctly greater area amount than the underside 9 of the charging device 1 or respectively aligning exiting casting material 7 can be kept away from the substrate 3 with the protrusion of separating film 4.

In FIG. 3 in a section along the gravity direction S, an example is shown of a mounting interface 14 produced with a method according to a third aspect of the disclosure. The method serves for the producing of the mounting interface 14 shown by way of example in FIG. 2 on a substrate 3 which can be driven on by an at least partially electrified motor vehicle 2—not shown in FIG. 3. The mounting interface 14 again is set up for a mounting of an electromagnetic charging device 1 on the substrate 3. With such an electromagnetic charging device 1, the at least partially electrified motor vehicle 2 can be charged inductively with electrical energy wirelessly, for example in a contactless manner. With regard to the method according to the third aspect of the disclosure, the motor vehicle 2 can correspond to the motor vehicle 2 described above and illustrated roughly schematically in FIG. 1.

The method according to the third aspect of the disclosure comprises three provisions a) to c). According to a first provision a) of the method, a flowable and hardenable substrate material 19 is cast which, after its hardening, forms the substrate 3 which can be driven on by the motor vehicle 2. In a second provision b) an adapter 15 for the mounting of the charging device 1 is arranged directly on the still flowable substrate material 19. Here, the adapter 15 is arranged according to provision b) in such a manner on the still flowable substrate material 19 that an underside 9 of the adapter 15 is wetted with the still flowable substrate material 19. According to the example of FIG. 3, the adapter 15 can be realized in the manner of a trough. It shall be understood that the adapter 15, however, can also have a different geometric shape, such as for example that of a plate. In the method according to the third aspect of the disclosure, the adapter 15 is, for example, subsequently aligned. Here, for the aligning of the adapter 15 for example an upper side 11 of the adapter 15, lying opposite the underside 9 of the adapter 15, is brought to coincide with the horizontal plane H. The method comprises in addition a third provision c), in which the adapter arranged in provision b) is (pre-)fixed to the substrate 3 in its alignment with hardening of the substrate material 19. As a result of this provision c), the mounting interface 14 is formed.

According to the exemplary embodiment shown in FIG. 3, at least one form-fit element 12 with an undercut 13 is present on the underside 9 of the adapter 15. The undercut 13 is, for example, oriented to the gravity direction S in an angled manner. For example, the form-fit element 12 in accordance with the method according to the first and according to the second aspect of the disclosure is enclosed by the still flowable casting material 7 or respectively by the still flowable substrate material 19. It shall be understood that in the method according to the first aspect of the disclosure, on the underside 9 of the charging device 1 likewise at least one form-fit element 12 with undercut 13 can be present, which is configured in an analogous manner to the example of FIG. 3 and is enclosed by the still flowable casting material 7.

In the method according to all aspects of the disclosure, the casting material 7 or respectively the substrate material 19 comprises for example a floating screed, which can be a calcium sulphate floating screed. Respectively alternatively or additionally, the casting material 7 or respectively the substrate material 19 can comprise a synthetic resin or a rubber mortar. Such a rubber mortar is offered under precisely this designation for example by the manufacturer MEM. The casting material 7 or respectively the substrate material 19 is, for example, filled. The casting material 7 or respectively the substrate material 19 can be filled with elastic fibres. The casting material 7 or respectively the substrate material 19, after its hardening, has for example a thermal conductivity of at least 1.5 W/(m*K).

According to the methods of all aspects of the disclosure for example at least one hole 20 is produced in the substrate 3, and an anchoring bolt 21 is fastened in the hole 20, cf. FIGS. 1 and 2. The hole 20 can be a blind hole. The producing of the hole 20 takes place for example chronologically before the arranging of the charging device 1 or respectively of the adapter 15. The producing of the hole 20 can take place before the laying of the separating film 4. An anchoring bolt 21 is introduced in the hole 20 and can be connected with the substrate 3 in a force-fitting or/and materially bonded manner, e.g., with peg, adhesive or casting material. The aligning of the charging device 1 or respectively of the adapter 15 is carried out here by hand-tight tightening of a screw connection 22 produced with the anchoring bolt 21 and acting on the charging device 1 or respectively on the adapter 15. For this, the at least one anchoring bolt 21 can comprise a thread onto which a screw nut is screwed, facing away from the hole 20. Here, chronologically after the hardening of the casting material 7 or respectively of the substrate material 19, the screw connection 22 is retightened for the (final) fixing of the charging device 1 or respectively of the adapter 15. For example, the screw connection 22 is tightened with a tightening torque of a maximum of 10 Newton metres for the (final) fixing of the charging device 1 or respectively of the adapter 15.

FIGS. 1 to 3 show respectively also an example of an arrangement 23 according to the disclosure for the wireless, for example contactless, charging of an at least partially electrified motor vehicle 2 with electrical energy. The arrangement 2 comprises a substrate 3, able to be driven on by the motor vehicle 2, which can form a parking space for parking the motor vehicle 2. For example, the substrate 3 can form the floor of a garage. The arrangement 23 comprises in addition an electromagnetic charging device 1, with which the motor vehicle 2 can be charged inductively with electrical energy. Alternatively, the arrangement 23 comprises a mounting interface 14, on which such an electromagnetic charging device 1 can be mounted or is mounted. Here, the charging device 1 is mounted on the substrate 3 with a method according to the first aspect of the disclosure, or respectively the mounting interface 14 is produced with a method according to the second or the third aspect of the disclosure. The mounting interface 14 can be configured universally, so that various charging devices 1 are able to be mounted with one and the same mounting interface 14.

It is understood that the foregoing description is that of the exemplary embodiments of the disclosure and that various changes and modifications may be made thereto without departing from the spirit and scope of the disclosure as defined in the appended claims.

What is claimed is:

1. A method for mounting an electromagnetic charging device with which an at least partially electrified motor vehicle can be charged inductively with electrical energy in a wireless, manner, on a substrate, the method comprising:
   (a) laying a deformable separating film on the substrate, such that an underside of the separating film touches an upper side of the substrate, wherein the upper side of the substrate is a surface on which the at least partially electrified motor vehicle can be driven;
   (b) applying a flowable and hardenable casting material onto an upper side of the separating film lying opposite the underside of the separating film;
   (c) arranging the electromagnetic charging device on the still flowable casting material, such that between an underside of the charging device and the upper side of the separating film a joint, filled with the casting material, is produced; and
   (d) pre-fixing of the charging device arranged according to provision (c) in its alignment with hardening of the casting material.

2. The method according to claim 1, wherein the separating film comprises a plastic or consists thereof.

3. The method according to claim 1, wherein the separating film comprises a metal, which consists of an aluminium.

4. The method according to claim 1, wherein:
   the separating film is formed in an embossed or folded manner, and
   a perpendicular extent of the embossing or fold of the separating film before the applying of the casting material in provision (b) is larger than a perpendicularly measured maximum unevenness of the upper side of the substrate.

5. The method according to claim 1, further comprising:
   (c1) producing a predetermined breaking point which after hardening of the casting material in provision (d)

runs along an edge of the charging device or respectively of the adapter surrounding the underside of the charging device or respectively of the adapter, wherein the predetermined breaking point is typically produced chronologically before the carrying out of provision (d).

6. The method according to claim 1, further comprising:
(d1) removing the protrusion of separating film and casting material situated outside the joint.

7. The method according to claim 1, wherein the separating film on laying in provision (a) corresponds to a flat blank which projects on all sides by at least 20 cm over the underside of the charging device or respectively of the adapter.

8. The method according to claim 1, wherein chronologically before the pre-fixing, the charging device or respectively the adapter is horizontally aligned.

9. The method according to claim 5, wherein:
on the underside of the adapter at least one form-fit element with an undercut is present, and
the form-fit element is enclosed by the still flowable casting material/substrate material.

10. The method according to claim 1, wherein:
the casting material or respectively the substrate material comprises floating screed calcium sulphate floating screed, or/and synthetic resin or/and rubber mortar; and/or
the casting material or respectively the substrate material is filled with elastic fibres.

11. The method according to claim 1, wherein the casting material or respectively the substrate material has a thermal conductivity of at least 1.5 W/(m*K) after hardening.

12. The method according to claim 1, wherein:
according to the method, chronologically before the arranging of the charging device or respectively of the adapter, most before the laying of the separating film, at least one hole is produced in the substrate and an anchoring bolt is fastened in the hole,
the aligning of the charging device or respectively of the adapter is carried out by hand-tight tightening of a screw connection produced with the anchoring bolt and acting on the charging device or respectively on the adapter, and
chronologically after the hardening of the casting material or respectively of the substrate material the screw connection is retightened with a tightening torque of a maximum of 10 Nm, for the (final) fixing of the charging device or respectively of the adapter.

13. An arrangement for the wireless, charging of an at least partially electrified motor vehicle with electrical energy, the arrangement comprising:
a substrate, able to be driven on by the motor vehicle, which forms a parking space;
an electromagnetic charging device, with which the motor vehicle can be charged inductively with electrical energy or with a universal mounting interface, at which such an electromagnetic charging device can be mounted or is mounted, wherein the charging device is mounted with a method according to claim 1.

14. A method for producing a mounting interface for a mounting of an electromagnetic charging device, with which an at least partially electrified motor vehicle can be charged inductively with electrical energy in a wireless, manner, on a substrate, the method comprising:
(a) laying a deformable separating film on the substrate, such that an underside of the separating film touches an upper side of the substrate, wherein the upper side of the substrate is a surface on which the at least partially electrified motor vehicle can be driven;
(b) applying a flowable and hardenable casting material onto an upper side of the separating film lying opposite the underside of the separating film;
(c) arranging an adapter for the mounting of the charging device on the still flowable casting material, such that between an underside of the adapter and the upper side of the separating film a joint, filled with the casting material, is produced; and
(d) pre-fixing the adapter, arranged according to provision (c), with hardening of the casting material, with production of the mounting interface.

15. An arrangement for the wireless, charging of an at least partially electrified motor vehicle with electrical energy, the arrangement comprising:
a substrate, able to be driven on by the motor vehicle, which forms a parking space;
an electromagnetic charging device, with which the motor vehicle can be charged inductively with electrical energy or with a universal mounting interface, at which such an electromagnetic charging device can be mounted or is mounted, wherein the mounting interface is produced with a method according to claim 14.

16. A method for producing a universal mounting interface for a mounting of an electromagnetic charging device, with which an at least partially electrified motor vehicle can be charged inductively with electrical energy in a wireless, manner, on or in a substrate, the method comprising:
(a) casting a flowable and hardenable substrate material on a surface of which the at least partially electrified motor vehicle can be driven, which after its hardening forms the substrate;
(b) arranging an adapter for the mounting of the charging device directly on the still flowable substrate material, such that an underside of the adapter is wetted with the still flowable substrate material; and
(c) pre-fixing of the adapter arranged according to provision (b) with hardening of the substrate material to the substrate, such that the mounting interface is formed.

17. The method according to claim 16, wherein the at least partially electrified motor vehicle can only be driven on the substrate material in an area outside the area where the adapter for the mounting of the charging device is arranged after the substrate material is hardened.

* * * * *

UNITED STATES PATENT AND TRADEMARK OFFICE
CERTIFICATE OF CORRECTION

Page 1 of 1

PATENT NO. : 12,017,548 B2
APPLICATION NO. : 17/492606
DATED : June 25, 2024
INVENTOR(S) : Thomas Himmer, Christopher Laemmle and Holger Schroth It is certified that error appears in the above-identified patent and that said Letters Patent is hereby corrected as shown below:

In the Claims

<u>In Column 12, Claim 14:</u>
Line 6: Delete "," after "wireless"

<u>In Column 12, Claim 16:</u>
Line 39: Delete "," after "wireless"

Signed and Sealed this
Thirtieth Day of July, 2024

Katherine Kelly Vidal
*Director of the United States Patent and Trademark Office*